United States Patent Office 3,285,328
Patented Nov. 15, 1966

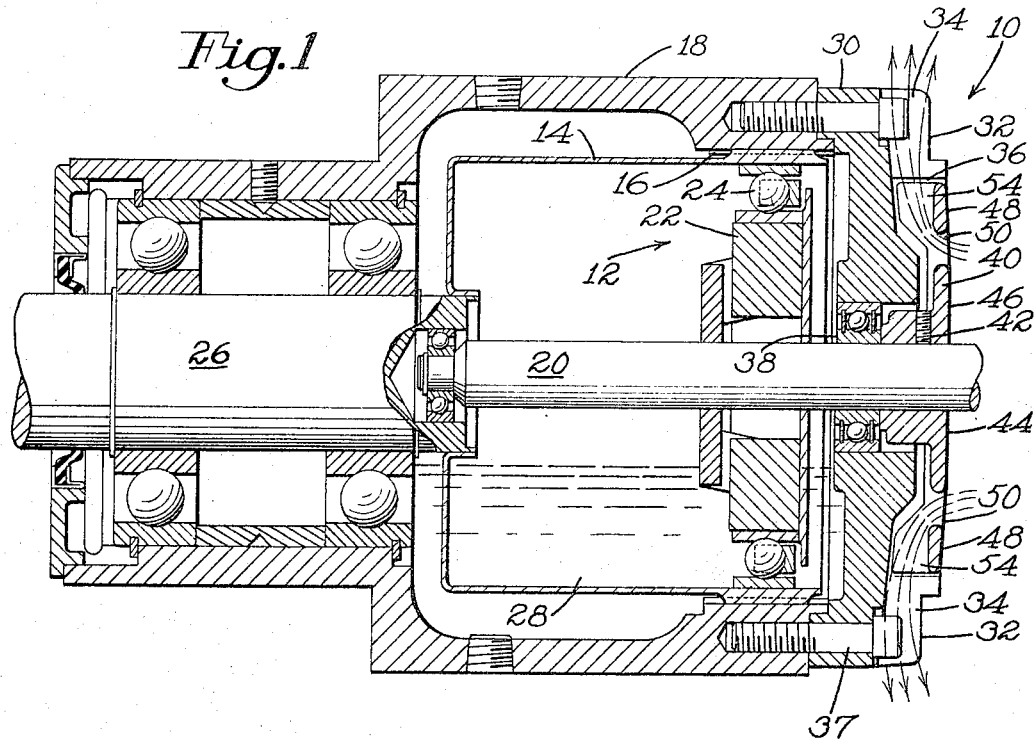
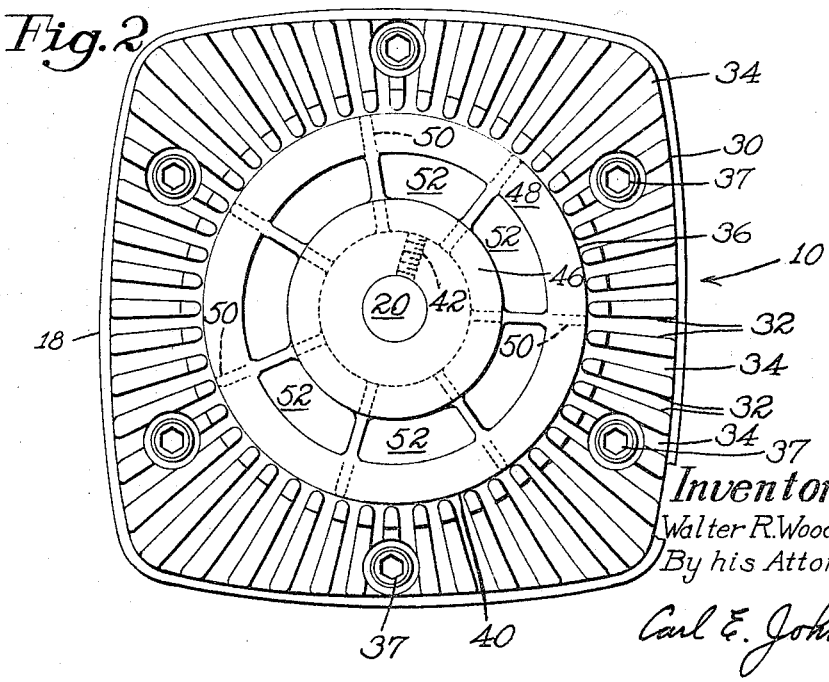

3,285,328
COOLING COVER ASSEMBLIES
Walter R. Woodward, Carlisle, Mass., assignor to United Shoe Machinery Corporation, Boston, Mass., a corporation of New Jersey
Filed Dec. 30, 1964, Ser. No. 422,323
6 Claims. (Cl. 165—47)

This invention relates to means for dispelling heat. More particularly the invention pertains to the provision of a fan-cooled cover assembly whereby heat generated within a housing may be continuously and effectively removed externally. While the invention is herein shown as applied to transfer heat from a speed reducer, it will be understood that usage of the invention is not thus limited, nor is it necessarily restricted for application to housings or enclosures for mechanism or electrical devices of any particular type.

It has long been recognized that the provision of fins or ribs on a heated wall aids in dissipating its heat and lowering and making more uniform its temperature. This is due to the increased surface area thus exposed to radiation, conduction, and convection in the cooling medium or atmosphere. To increase convectional cooling it is often the practice, as with motors and reducers or the like, to cause a fan to circulate fluid, for instance air, over the heated localities to be cooled. It is often inadequate merely to provide cooling by means of ribs, but highly desirable to retain a lubricating means together with an effective convection system.

In view of the foregoing it is an object of this invention to provide, in economical and effective combination with a housing for lubricated operating mechanism having at least a portion to be cooled, a novel and improved convectional cover assembly mounted closely adjacent to said portion.

A further object of the invention is to provide an improved air-cooling cover assembly which shall be compact yet simple in design, and incorporate an external fan and stationary ducts mounted and arranged to insure the safety of persons in close proximity thereto.

To these ends, and in accordance with a feature of the invention, there is provided externally of a lubricant-retaining chamber or housing to be cooled a radially ribbed cover mounted on the housing, the cover being adapted to receive a rotary shaft, and a fan operatively connected to the shaft and having blades recessed in the cover for flowing cooling fluid radially over the ribbed surface of the cover. As shown herein the rotary shaft delivers input power to mechanism within the housing including a bearing under load the heat from which it is desirable to dispel. The particular nature of the mechanism or other source of the heat to be dissipated is not relevant to the present invention, though it will be recognized that, in addition to providing suitable lubrication, for instance by means of an oil bath or sump, it is desirable to utilize cooling means as permitted by this invention closely adjacent to the heat source and without any possibility of impairment of the lubrication.

Another feature of this invention resides in the provision, on the shaft-receiving wall of a housing, of an external cooling cover bored to receive the shaft and having a circualr recess thereabout, the cover being formed with ribs to provide radial ducts emanating from the recess, and impeller or fan means in said recess and operable by the shaft, the fan means having an external vented face which is substantially flat and internal radial blades whereby fluid drawn axially inward by the fan means is expelled through the ducts.

The above and other features of the invention, including novel details in construction, will now be more particularly described in connection with an illustrative embodiment, and with reference to the accompanying drawings, in which:

FIG. 1 is a longitudinal sectional view of a harmonic drive type speed reducer having a wave generator bearing the heat from which is to be dispelled, and an exemplary cooling cover assembly employed for this purpose, and FIG. 2 is an end elevation of the cooling cover assembly shown in FIG. 1.

In the embodiment selected for purposes of illustration the cooling cover assembly 10 is applied to an actuator of the harmonic drive type. As more fully disclosed in United States Letters Patent No. 2,906,143, issued September 29, 1959, in the name of C. Walton Musser, for instance, a harmonic drive may include three basic, coaxial elements, namely: a wave generator herein generally designated 12, a flexspline 14 which may be of cup-shaped configuration, and a rigid circular spline 16, in this case internally formed integrally with a stationary housing 18. As shown in FIG. 1 these elements constitute a speed reducer the input to which is, in this instance, by means of a shaft 20. The wave generator 12 consists, for example, of an ellipsoidal cam 22 keyed on the shaft 20, and a wave generator ball bearing 24 designed to impart to the open or spline-carrying end of the flexspline 14 the shape of the cam 22 and to generate a circumferential wave of radial deflection. Accordingly, the reaction or circular spline 16, which normally will have two (or a multiple thereof) more spline teeth than those of the flexspline 14, is caused to be engaged thereby at progressive diametrical localities, and output at reduced speed is via the flexspline to an output shaft 26 one end of which serves coaxially to journal the inboard end of the input shaft 20.

In the operation of any device under load, and specifically in the function of a bearing, for example the bearing 24, heat is given off as work is performed. As is well known, if the heat is not dissipated fast enough, destructively high temperature build-up may ensue. Provision of a lubrication system of some suitable type, for instance an oil sump as indicated at 28, is helpful if not essential. When despite the use of lubricant, an operating unit, because of the degree of load or otherwise, generates excessive heat to be removed the added simple cooling cover assembly 10 afforded by this invention has been found both safe and reliably effective.

It will be understood that the cover assembly 10 is preferably mounted as close to the heat source, whether friction and/or otherwise, as circumstances will reasonably permit. As shown in FIG. 1 the assembly comprises a generally imperforate end cap or diffuser cover 30 having external, radially extending fins or ribs 32 forming circumferentially spaced channels or ducts 34 which emanate from a shallow, circular recess 36. Bolts 37 extending through the cover secure it to the housing 18. The cover 30 is axially bored to receive a bearing 38 for the shaft 20, and a one-piece fan 40 is operatively nestled within the recess 36, a hub of the fan receiving a setscrew 42 engaging the shaft 20. Referring to FIGURE 1, an external face 44 of the fan is even with surrounding external portions of the ribs 32 and is substantially flat to avoid the possibility of its causing injury or snagging clothing and the like. Preferably the external face 44 includes concentric annular portions 46, 48. These are connected by radial blades 50 the exposed, short mid portions of which have rounded edges and, together with the portions 46, 48, define circularly arranged intake vents 52 (FIG. 2). As will be apparent from the arrows indicated in FIG. 1, a cooling fluid such as air will be impelled radially outward through the ducts 34 to cool the cover 30 as axially enlarged outer paddle portions 54 of the respective blades rotate within the recess 36. With the shaft 20 bi-directional, preferably the blades are straight, not canted, and normal to the externl face of the cover 30, the fan 40 thus being bi-directional and equally effective in clockwise or counter-clockwise rotation.

From the foregoing it will be understood that cooling fluid such as air continually enters the cover recess 36 axially through the vents 52 and is forced radially outward by the blades 50 thus convectionally removing heat during its passage in contact with the cover 30. The latter serves to retain the lubricant while cooling it and the interior of the housing 18, and is preferably of a good heat conducting material such as aluminum. The fan 40 may be of a suitable light weight material, for instance aluminum or a plastic such as nylon. The simplicity, safety and reliability of the assembly 10 have proven advantageous in cooling regardless of its orientation; precaution is taken that the bearing 38 is suitably sealed when necessary. Effectiveness of the assembly 10 in connection with speed reducers of the type shown, for example, has enabled larger output torque ratings to be assigned given sizes of housings. Moreover the inexpensive cover assembly does not restrict cascading within gear boxes or flange-mounted motors; it need cause no redesign of commonly used or preexisting lubricating systems. It will be appreciated that the cooling cover assembly 10 need not necessarily, in other applications of the invention, be mounted on an input member such as the shaft 20, or on a rotary output member of the device to be cooled, but may be mounted in any selected position and have operative connection to any available source of rotary power. If an independent power source is utilized for operating the fan 40, the cover 30 need not be axially bored. In another and different application of the invention, that of explosion-proof electric motors for example, where no lubricating sump is provided but heat from within must be dispelled, cooling may be advantageously effected by mounting at one or both axial ends a cover assembly 10 thus eliminating the need for external protective shrouds which are ordinarily required.

Lastly, the assembly 10 provides cooling effectiveness exponential with speed. This feature advantageously compensates temperature-wise for change in operating speed of the device mounting the assembly since, without it, the temperature would increase, but with it the average temperature is lowered and tends to evenness.

It will be understood that if the source of input power to the fan 40 is unidirectional, both the ribs 32 and the channels 34 would be canted in conventional centrifugal fan fashion to achieve optimum efficiency. It is most particlarly to be noted, however, that blowing or flowing efficiency is not necessarily the sole or even the primary factor involved in the convection cooling attained by the cover assembly 10 whether its channels and ribs be canted or not. An important additional consideration is the attainment of effective convective scrubbing action. This is accomplished by the sweeping of the fan blades, especially their paddle portions 54, in close proximity to the walls of the recess 36. A thin layer of highly heated fluid which might otherwise tenaciously cling to the wall surface is thus rigorously scrubbed away and centrifugally expelled, and heat transfer from the shaft and bearing zone is thereby greatly improved.

Though not readily apparent from FIG. 2, the blades 50 (which may be either even or uneven in number) are preferably spaced at slightly uneven angles in order to supress acoustical reinforcement in passing the evenly spaced ribs 32. This non-equiangular mounting of the blades is accomplished (either by trial or by mathematical design) in a manner to achieve and maintain the mass of the fan 40 in balance about its X, Y, and Z axes. It is alternatively possible, when desired, to suppress acoustical reinforcement by spacing the ribs unevenly and spacing the blades evenly, and in special instances particular harmonic patterns may be thus obtained.

Having thus described my invention, what I claim as new and desire to secure by Letters Patent of the United States is:

1. Means for cooling a lubricated heat-generating mechanism within a housing, the mechanism having a rotating member extending into the housing, comprising a heat conductive, generally imperforate, stationary cover bored to receive said member and secured to the outside of the housing adjacent to said mechanism, said cover having an external face an inner portion of which is formed with a recess and an outer portion of which is formed with spaced ribs and ducts extending from the recess, and a one-piece rotary fan mounted in the external cover recess and having operative connection with the member, the fan being axially vented and having its exterior extending evenly with the outer portion of said external cover face and the inside of the fan including radial blades for circulating cooling fluid through said ducts.

2. Cooling means as set forth in claim 1 and further characterized in that said fan is bi-directional, its blades being normal to the external face of said cover, straight, and radial in order to provide equal effectiveness in cooling regardless of the direction of rotation.

3. A cooling means as set forth in claim 1 wherein the fan includes concentrically flat annular portions which, together with mid portions of the blades, define circularly arranged intake vents.

4. A cooling assembly comprising a cover of heat conductive material and having formed externally thereon a plurality of spaced, radially extending convection ribs, the inner ends of said ribs defining a circular recess, and a ventilating fan rotatably mounted in said recess, the fan being externally flat and even with said ribs, and an inner portion of the fan being formed with blades respectively disposed between annular intake vents open through its flat exterior, said blades having a shape substantially corresponding with the depth and radius of the walls of said recess to improve heat transfer by means of local convective scrubbing action as well as centrifugal efflux of cooling fluid.

5. A cooling cover assembly as set forth in claim 4 wherein the ribs are equi-angularly spaced, and the blades are positioned at slightly uneven angles while maintaining dynamic balance of the mass of the fan to suppress acoustical reinforcement.

6. An assembly as set forth in claim 4 wherein the ribs are angularly unevenly spaced and the blades are equi-angularly spaced to suppress acoustical reinforcement.

References Cited by the Examiner

UNITED STATES PATENTS 3,149,666  9/1964  Coe _____ 165—121

FOREIGN PATENTS 557,863  5/1958  Canada.
566,830  1/1945  Great Britain.
720,567  12/1954  Great Britain.

ROBERT A. O'LEARY, *Primary Examiner.*

M. A. ANTONAKAS, *Assistant Examiner.*